(12) United States Patent
Van Dijk et al.

(10) Patent No.: US 9,268,082 B2
(45) Date of Patent: Feb. 23, 2016

(54) FREE FORM LIGHTING MODULE

(75) Inventors: Erik Martinus Hubertus Petrus Van Dijk, Den Bosch (NL); Erik Boonekamp, Utrecht (NL); Rene Henri Wouter Van Der Wal, Lichtenvoorde (NL); Antonius Petrus Marinus Dingemans, Kaatsheuvel (NL)

(73) Assignee: Koninklijke Philips N.V., Eindhoven (NL)

( * ) Notice: Subject to any disclaimer, the term of this patent is extended or adjusted under 35 U.S.C. 154(b) by 162 days.

(21) Appl. No.: 13/382,938

(22) PCT Filed: Jul. 6, 2010

(86) PCT No.: PCT/IB2010/053085
§ 371 (c)(1),
(2), (4) Date: Jan. 9, 2012

(87) PCT Pub. No.: WO2011/004320
PCT Pub. Date: Jan. 13, 2011

(65) Prior Publication Data
US 2012/0113676 A1    May 10, 2012

(30) Foreign Application Priority Data
Jul. 9, 2009 (EP) .................................. 09165013

(51) Int. Cl.
*F21V 7/04* (2006.01)
*F21V 8/00* (2006.01)
(Continued)

(52) U.S. Cl.
CPC ............ *G02B 6/0045* (2013.01); *G02B 6/0036* (2013.01); *G02B 6/0063* (2013.01);
(Continued)

(58) Field of Classification Search
CPC .. G02B 6/0043; G02B 5/0247; G02B 6/0096; G02B 6/0016; G02B 6/0036; G02B 6/0063; G02F 1/133615; F21V 14/04; F21V 7/0008; F21S 6/008; F21W 2131/402

USPC .................. 362/607, 609, 616, 623–625, 628, 362/249.04, 249.08, 278, 320, 626
See application file for complete search history.

(56) References Cited

U.S. PATENT DOCUMENTS 4,856,873 A * 8/1989 Kleinberg ...................... 359/363
5,410,454 A * 4/1995 Murase et al. ................. 362/611
(Continued)

FOREIGN PATENT DOCUMENTS

| GB | 2430071 A | 3/2007 |
|---|---|---|
| JP | 2005093147 A | 4/2005 |

(Continued)

*Primary Examiner* — Jong-Suk (James) Lee
*Assistant Examiner* — Erin Kryukova (57) ABSTRACT

The invention provides an illumination device (1) comprising (a) a waveguide element (20) comprising a first face (21), a second face (22), and a waveguide edge (23), and (b) a LED light source (10), arranged to generate light source light (17), with optional collimating optics (11). The LED light source (10) with optional collimating optics (11) is arranged to couple at least part of the light source light (17) into the waveguide element (20) via the waveguide edge (23) of the waveguide element (20). The first face (21) comprises structures (51) arranged to couple at least part of the light out of the waveguide element (20) via the second face (22) to provide second face light (37). The illumination device (1) further comprises a cavity (80), arranged to allow light to escape from the waveguide element (20) into the cavity (80), and a reflector (81), arranged to reflect at least part of the light in the cavity (80) in a direction away from the second face (22) to provide first face light (47). Such an illumination device may allow lighting a room, for instance via the ceiling with uplight, and lighting a specific area in the room with downlight. Further, a relatively thin illumination device may be provided, which may for instance suspend from a ceiling.

17 Claims, 8 Drawing Sheets

(51) Int. Cl.
*G02F 1/1335* (2006.01)
*F21S 8/06* (2006.01)
*F21V 14/04* (2006.01)
*F21V 14/08* (2006.01)
*F21Y 101/02* (2006.01)

(52) U.S. Cl.
CPC ............... *G02B6/0078* (2013.01); *F21S 8/06* (2013.01); *F21V 14/04* (2013.01); *F21V 14/08* (2013.01); *F21Y 2101/02* (2013.01); *G02B 6/0043* (2013.01); *G02B 6/0068* (2013.01); *G02B 6/0073* (2013.01); *G02F 1/133615* (2013.01); *G02F 2001/133628* (2013.01)

(56) References Cited

U.S. PATENT DOCUMENTS

| | | | |
|---|---|---|---|
| 5,438,484 A * | 8/1995 | Kanda et al. | 362/613 |
| 5,461,808 A * | 10/1995 | Fritts | 40/571 |
| 5,704,703 A * | 1/1998 | Yamada et al. | 362/27 |
| 6,185,357 B1 | 2/2001 | Zou et al. | 385/133 |
| 6,547,408 B1 * | 4/2003 | Greiner | 362/625 |
| 6,612,709 B2 | 9/2003 | Yamada et al. | 362/617 |
| 6,648,486 B2 * | 11/2003 | Harbers et al. | 362/613 |
| 6,672,734 B2 * | 1/2004 | Lammers | 362/612 |
| 6,893,134 B2 * | 5/2005 | Takahashi et al. | 362/615 |
| 6,975,455 B1 * | 12/2005 | Kotchick et al. | 359/485.03 |
| 7,020,364 B2 | 3/2006 | Ghiron et al. | 385/36 |
| 7,080,933 B2 * | 7/2006 | Chen et al. | 362/616 |
| 7,188,988 B2 * | 3/2007 | Koganezawa | 362/616 |
| 7,236,663 B2 * | 6/2007 | Wakita et al. | 385/31 |
| 7,267,470 B2 * | 9/2007 | Chang | 362/621 |
| 7,478,938 B2 * | 1/2009 | Watanabe et al. | 362/607 |
| 7,513,670 B2 * | 4/2009 | Yang et al. | 362/609 |
| 7,777,833 B2 * | 8/2010 | Hwang et al. | 349/65 |
| 7,845,826 B2 * | 12/2010 | Aylward et al. | 362/243 |
| 8,092,061 B2 * | 1/2012 | Sylvester et al. | 362/559 |
| 8,303,155 B2 * | 11/2012 | Shigeta et al. | 362/620 |
| 8,373,820 B2 * | 2/2013 | Lee et al. | 349/62 |
| 2001/0046142 A1 * | 11/2001 | Van Santen et al. | 362/561 |
| 2004/0041965 A1 * | 3/2004 | Liu | 349/113 |
| 2004/0183962 A1 | 9/2004 | Hua-Nan et al. | |
| 2004/0246743 A1 * | 12/2004 | Lee et al. | 362/561 |
| 2005/0117368 A1 * | 6/2005 | Kim | G02B 6/0055 362/609 |
| 2006/0055843 A1 | 3/2006 | Hahm et al. | |
| 2006/0140562 A1 * | 6/2006 | Joseph et al. | 385/124 |
| 2006/0203516 A1 | 9/2006 | Watanabe et al. | |
| 2006/0221638 A1 * | 10/2006 | Chew et al. | 362/613 |
| 2006/0221642 A1 | 10/2006 | Daiku et al. | |
| 2007/0086211 A1 * | 4/2007 | Beeson et al. | 362/628 |
| 2007/0127261 A1 | 6/2007 | An et al. | |
| 2007/0159679 A1 * | 7/2007 | Hagood et al. | 359/291 |
| 2007/0188677 A1 * | 8/2007 | Souk et al. | 349/65 |
| 2007/0279727 A1 * | 12/2007 | Gandhi et al. | 359/242 |
| 2008/0030974 A1 | 2/2008 | Abu-Ageel | |
| 2008/0112190 A1 * | 5/2008 | Liu et al. | 362/628 |
| 2008/0130319 A1 * | 6/2008 | Hsung et al. | 362/626 |
| 2008/0138024 A1 | 6/2008 | Parker et al. | |
| 2009/0273947 A1 * | 11/2009 | Takada | 362/611 |
| 2010/0165659 A1 | 7/2010 | Ise et al. | |

FOREIGN PATENT DOCUMENTS

| | | | |
|---|---|---|---|
| JP | 2005274907 A | 10/2005 | |
| WO | 2006097859 A2 | 9/2006 | |
| WO | 2008126023 A2 | 10/2008 | |
| WO | WO 2009051125 A1 * | 4/2009 | F21V 7/04 |

\* cited by examiner

Fig 7d

FREE FORM LIGHTING MODULE

FIELD OF THE INVENTION

The invention relates to an illumination device comprising a waveguide.

BACKGROUND OF THE INVENTION

Waveguide systems in lighting, especially in LCD backlighting, are known in the art.

GB 2430071 for instance has for its object to provide a backlight unit having good display quality, and a liquid crystal display device provided with the same. To this end, a light source, a reflection sheet, a light guide plate, a gas space, and a diffusion plate are installed. The reflection sheet, light guide plate, gas space, and a diffusion plate are superposed in the order mentioned. The light source is in the form of individual light sources having different spectra or different amounts of luminescence and being disposed in the vicinity of the incident surface of the light guide plate. The surface of the light guide plate opposite to the reflecting sheet is provided with scattering dots, whereby the light transmitted through the light guide plate is taken out to the reflection plate side.

US 2004183962 describes a backlight module for providing light with a more uniform light distribution and greater brightness. The backlight module includes at least a luminary for providing light, a light guide assembly disposed adjacent to the luminary for guiding a first portion of the light, a translucent membrane having a plurality of openings, and a reflector disposed below the light guide assembly. A second portion of the light passes upwardly through the openings and a third portion of the light is directed upwardly by the light guide assembly after being reflected by the translucent membrane and the reflector. The light guide assembly includes a plurality of light guide plates, wherein the bottom of at least one light guide plate can be a triangular concave or an arc concave, and the light guide plates can contain some doping particles.

Further, US 2006055843 describes an LCD backlight apparatus which includes a light guide plate placed under an LCD panel of the LCD to guide light to the LCD panel. The light guide plate has an even upper surface and a scattering pattern formed in a bottom surface. A plurality of monochromatic light sources are placed in line at a side of the light guide plate to radiate light along the plane direction of the light guide plate between the upper and bottom surfaces of the light guide plate. The light sources are adapted to radiate light beams at a predetermined beam angle so that the light beams reach the scattering pattern only after having propagated a predetermined reference distance necessary for forming white light when mixed together. The LCD backlight apparatus can reduce the bezel width without increasing the thickness of an LCD.

SUMMARY OF THE INVENTION

Prior art systems may not have the ability of providing light to both sides of a flat waveguide. There is however a desire to provide a lighting device that is able to provide light to two directions: for instance uplight directed to a ceiling to provide indirect illumination that can be used as atmosphere/mood lighting and downlight for target (task) lighting. Uplight may contribute to a more convenient lighting of a space, such as a room or an office, and may contribute to the fulfillment of the UGR (unified glare rating) norm for offices. Such a device may be used in homes, offices, hospitality areas, etc. There is further a desire to provide such a device, wherein the relative amounts of uplight and downlight are tunable.

Hence, it is an object of the invention to provide an alternative illumination device, which preferably further at least partly obviates one or more of the above-described drawbacks, and which may further preferably fulfill one or more of the above indicated desires.

To achieve this, the invention provides, in a first aspect, an illumination device comprising:

a. a waveguide element comprising a first face (hereinafter often also, indicated as "top face", for the sake of understanding), a second face (hereinafter often also indicated as "bottom face", for the sake of understanding), and a waveguide edge;

b. a LED light source, arranged to generate light source light, with optional collimating optics, wherein the LED light source with optional collimating optics is arranged to couple at least part of the light source light into the waveguide element via the waveguide edge of the waveguide element; and wherein the first face comprises structures arranged to couple at least part of the light out of the waveguide element via the second face to provide second face light (hereinafter often also indicated as "downlight", for the sake of understanding); wherein the illumination device further comprises a cavity, arranged to allow light to escape from the waveguide element into the cavity, and a reflector, arranged to reflect at least part of the light in the cavity in a direction away from the second face to provide first face light (hereinafter often also indicated as "uplight", for the sake of understanding).

Such an illumination device may allow lighting a room, for instance via the ceiling, with uplight and lighting a specific area in the room with downlight. Both the arrangement and the kind of structures, as well as the optional presence of a reflector at the first face, allows tuning the ratio of downlight and uplight (for instance at the manufacturer). Further, a relatively thin illumination device may be provided, which may for instance suspend from a ceiling. The ratio of downlight and uplight may for instance be in the range of 0.01-100, such as 1-10, like 2-5. A typical up/down ratio may be in the range of 0.2 to 0.8.

In general, the waveguide element will be in the form of a plate, especially a thin plate having for instance a thickness in the range of about 0.1-20 mm, such as 1-10 mm. The waveguide element may be flat or curved; the waveguide may also have a wave shape. Preferably, the first and the second face are arranged substantially parallel (which includes parallel curved faces). Further, the waveguide element may have any shape, such as selected from the group comprising square, rectangular, round, oval, triangular, pentagonal, hexagonal, etc. Hence, the invention provides an illumination device having a "free" shape. Herein, the waveguide element may also be indicated as "waveguide" or "light guide". The total thickness of the illumination device may be in the range of about 1-50 mm, such as 5-15 mm.

The waveguide element may comprise one or more materials selected from the group consisting of a transmissive organic material support, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), polycarbonate, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment the waveguide element may comprise an inorganic material. Preferred inorganic materials are selected from the group consisting of glasses, (fused) quartz, transmissive ceramic materials, and silicones. Especially preferred are PMMA, PC, transparent PVC, or glass as the material for the waveguide element.

In a specific embodiment, light from the LED light source is collimated before entering the edge of the waveguide element. The light coupled into the waveguide is herein also indicated as "waveguide light". The illumination device may comprise a plurality of LED light sources with optional collimating optics. The plurality of LED light sources may comprise two or more types of LED light sources arranged to emit at different emission wavelengths, respectively. For instance, blue LEDs and yellow LEDs, or blue LEDs and green LEDs and red LEDs may be provided. Such combinations may be arranged to be able to provide white light. Optionally, one or more of the plurality of LEDs, or one or more subsets of the plurality of LEDs, may be controlled independently of the other LEDs or subset(s) of LED, respectively. The plurality of LED light sources may be distributed evenly or unevenly over the edge of the waveguide. This further contributes to the free form of the illumination device.

The phrase "in a direction away from the first face" indicates that light travels in a direction which is an extension of a propagation from the interior of the waveguide in the direction of the first face. Likewise, the phrase "in a direction away from the second face" indicates that light travels in a direction which is an extension of a propagation from the interior of the waveguide in the direction of the second face. Light emanating from the first and second face may have an intensity distribution (such as a Lambertian, see also below ($I=I(0)*\cos(\alpha)$), but all directions within such distributions are away from the first and second face, respectively.

The phrase "structures arranged to couple at least part of the light out of the waveguide element via the second face to provide second face light" indicates that the first face comprises structures, such as dots or stripes or grooves, etc., that are arranged to promote outcoupling of waveguide light in a direction away from the first face, and the light escapes from the waveguide as light from the second face, to provide downlight. Such structures, especially paint dots or stripes, can thus have the function of "mini-downlighters". They may induce reflection of the light coupled into the waveguide in a direction away from the first face, which reflected light may (then) escape from the waveguide via the second face as downlight. Such structures may be arranged on or comprised in the first face. In a specific embodiment, the first face comprises a pattern of (white, diffuse) reflective dots or stripes as structures. Such a pattern may be printed on the first face, for example by means of screen printing or inkjet printing. Typical materials may be white pigments, such as $TiO_2$ and/or $Al_2O_3$ comprising pigments. Such pigments may further include a binder. The local density of the outcoupling structures can be optimized to ensure uniform outcoupling of light over the whole area (of the second face) of the waveguide element. In another embodiment, the structures comprise 3D perturbations to the second surface. An example of patterning for extracting light in a desired direction is described by T. L. R. Davenport et al., "Optimizing density patterns to achieve desired light extraction for displays", Proceedings of SPIE, the International Society for Optical Engineering, ISSN 0277-786X CODEN PSISDG.

Incoupled light, i.e. light within the waveguide, impinging on the first face might, dependent on the structures, escape from the waveguide. In order to minimize loss of light escaping from parts of the waveguide other than the cavity and the second face, a reflector may be arranged downstream of the first face comprising structures. Hence, in a specific embodiment, the illumination device further comprises a reflector, arranged to reflect light escaping from the first face back into the waveguide. Further, such reflector may also be used as, or be in contact with, a heat sink, arranged to facilitate removal of heat from the waveguide. In a specific embodiment, the first face is in contact with a heat sink; i.e. at least part, preferably a substantial part, of the first face comprising structures is in contact with a heat sink.

The illumination device further comprises a cavity. Such a cavity is especially a hollow feature in the waveguide element or a hollow feature at least part of the edge of the waveguide element. In both cases, part of the waveguide light may escape from the waveguide element into the cavity. In a specific embodiment, the cavity is a recess in the first face. In yet another embodiment, the cavity is a cavity extending from the first face to the second face (i.e. a hole). In a specific embodiment, the illumination device comprises a plurality of cavities. In this way, light may escape at a plurality of sites. This may lead to a more homogeneous distribution of the uplight.

Part of the light escaping from the waveguide may leave the cavity as uplight. In order to facilitate the escape of light from the cavity in a direction away from the second face, the cavity may further comprise a reflector, arranged to reflect at least part of the light in the cavity in a direction away from the second face so as to provide uplight.

The cavity may have any shape, such as cubic, orthorhombic, cylindrical, or an elliptic cylinder, trigonal prism, pentagonal prism, hexagonal prism, etc., but the wall of the cavity may in an embodiment also be at least partly tapered, especially in a direction from the first to the second face.

In a specific embodiment, the illumination device comprises a plurality of waveguides.

Each waveguide may comprise one or more cavities of its "own". As mentioned above, such a cavity is especially a hollow feature in the waveguide element or a hollow feature at least part of the edge of the waveguide element. However, in embodiments where the illumination device comprises a plurality of waveguides, and where the illumination device comprises one or more cavities, the one or more cavities may also be cavities between adjacent waveguides, respectively.

In a specific embodiment, the illumination device further comprises a diffuser, arranged downstream of the second face. Such a diffuser may facilitate the mixing of different light rays escaping from the second face. Especially, when a plurality of different emission colors is used, such a diffuser may be beneficial. Typical diffusers are for instance translucent materials. The diffuser may for instance be a holographic diffuser. Also various diffuser foils can be used, such as light-shaping diffusers from Luminit ("holographic diffusers"), diffusers from Fusion Optix or Bright View Technologies).

The diffuser is especially arranged to diffuse substantially all light escaping from the second face. The diffuser may also be arranged to recycle light (see also below).

The term diffuser may also relate to a plurality of diffusers. The diffuser may for instance (also) be a plate (or a plurality of plates), having substantially the same shape and surface area as the second face. In an embodiment, the diffuser is in contact with the second face over substantially the whole surface thereof. Hence, in an embodiment, the illumination device comprises a stack of the waveguide element and the diffuser. As will be mentioned below, the term stack may include embodiments in which there is no contact between the optical elements of the stack, for instance due to a distance of at least 5 µm.

The terms "upstream" and "downstream" relate to an arrangement of items or features regarding the propagation of light from a light generating means (here the light source, such as the LED), wherein relative to a first position within a beam of light from the light generating means, a second position in the beam of light closer to the light generating means is "upstream", and a third position within the beam of light further away from the light generating means is "downstream".

In yet a further embodiment, the illumination device may further comprise (glare-suppression) optics, arranged downstream of the second face, and if present, arranged downstream of the optional diffuser (see above). Glare-suppression optics is preferably relatively thin, enabling a thin illumination device to be provided. An example of preferred glare-suppression optics is described in WO2006097859 (a translucent lighting panel), which is incorporated herein by reference.

Glare-suppression optics is especially arranged to pass substantially all light escaping from the second face and the optional diffuser in such a way that glare may be reduced.

The term glare-suppression optics may also relate to a plurality of glare-suppression optics. The glare-suppression optics may for instance (also) be a plate (or a plurality of plates), having substantially the same shape and surface area as the second face. In an embodiment, the glare-suppression optics is in contact with the second face over substantially the whole surface thereof. In yet another embodiment, in which the diffuser is present, the glare-suppression optics is in contact with the diffuser over substantially the whole surface thereof. Hence, in an embodiment, the illumination device comprises a stack of the waveguide element and glare-suppression optics, or a stack of the waveguide element, the diffuser and glare-suppression optics.

For instance, the (glare-suppression) optics, such as the translucent lighting panel, may have at its outer side a profiled surface in order to direct the emitted light radiation mainly into a predetermined zone, which light radiation travels at relatively small angles with respect to the direction perpendicular to the plane of the lighting panel, and wherein light radiation at small angles to the plane of the lighting panel is reduced, particularly when the illumination device must have a relatively high intensity. To achieve this, the material of the lighting panel may contain a light-absorbing agent in such a quantity that the intensity of a light beam passing through the lighting panel substantially perpendicularly to the plane of the lighting panel decreases by 1% to 20% due to the presence of the light-absorbing agent. Such a light-absorbing and non-scattering agent, for example, a pigment or a dye, is well known in the art. It has been found that light radiation leaving the profiled surface of the lighting panel at its front side at a relatively small angle to the plane of the lighting panel has followed long paths through the material of the lighting panel, which paths are disproportionally long as compared to the length of the paths of light radiation leaving the lighting panel in a direction within the predetermined zone. Consequently, a relatively small quantity of light-absorbing agent is effective in order to absorb light radiation that would otherwise leave the lighting panel at a small angle to the plane of the lighting panel, while this relatively small quantity of light-absorbing agent has a very limited influence on the light radiation that leaves the lighting panel at a relatively small angle to the direction perpendicular to the plane of the lighting panel. In a preferred embodiment, the material of the lighting panel contains a light-absorbing agent in such a quantity that the intensity of a light beam passing through the lighting panel substantially perpendicularly to the plane of the lighting panel decreases by 2% to 15%, preferably 5% to 10%, due to the presence of the light-absorbing agent.

In another preferred embodiment, the outer side of the lighting panel has a profiled surface, at least half of which, preferably more than 75%, more preferably more than 95%, is positioned at an angle between 30° and 45°, preferably between 35° and 38° with respect to the plane of the lighting panel. Optimal results are obtained with a lighting panel made of an acrylic resin or polycarbonate, wherein the surface of the outer side is provided with protrusions, so that all parts of the surface of the outer side are positioned at an angle of 36° to the plane of the lighting panel.

In a further preferred embodiment, the light-absorbing agent is spectrally neutral, i.e. all wavelengths of the visible light are absorbed to substantially the same degree, so that the remaining light radiation has substantially the same color as the light radiation emitted by the light source in the illumination device. For certain applications it will be desired that the illumination device radiates any color of light other than the color of light from the light source.

In another preferred embodiment, the light-absorbing agent absorbs certain wavelengths of visible light to a larger extent than other wavelengths of visible light. Such an agent having a certain spectral absorption will intensify the relevant color in the light radiation at small angles to the plane of the lighting panel to a much larger extent than in said predetermined zone in front of the illumination device. In said predetermined zone, there will be no more than a small amount of color, if any, in the light radiation, whereas the light radiation in other directions will be really colored.

In a preferred embodiment, said outer side of the lighting panel is provided with protrusions having a substantially conical surface that tapers from the base portion of the protrusions which extend in a direction away from the lighting panel. In another preferred embodiment, said outer side of the lighting panel is provided with protrusions having a substantially pyramidal surface that tapers from the base portion of the protrusions which extend in a direction away from the lighting panel. In a top view of the protrusions, substantially the whole circumference of the base portions of the protrusions preferably abuts against similar surrounding protrusions. Optimal results are obtained by using a lighting panel, wherein all parts of the surface at the outer side of the lighting panel are positioned at an angle of about 35°.

In an embodiment, the outer side of the lighting panel has a profiled surface, at least half of which is positioned at an angle between 20° and 50° to the plane of the lighting panel, the material of the lighting panel containing a light-absorbing agent in such a quantity that the intensity of a light beam passing through the lighting panel substantially perpendicularly to the plane of the lighting panel decreases by 1% to 20% due to the presence of the light-absorbing agent.

In yet a further embodiment, the illumination device may further comprise a spacing downstream of the second face and upstream of one or more of the diffuser and glare-suppression optics. The optional diffuser and the optional glare-suppression optics or another exit window, may be arranged at a distance from the second face. Preferably, one or more of the diffuser and glare-suppression optics are present, and one or more of these are arranged at a non-zero distance from the second face, respectively. In this way, a kind of spacing is provided. Especially, when a plurality of different emission colors is used, such spacing may be beneficial. The spacing may contain a vacuum or a gas, such as air. Especially, the optics downstream of the waveguide face(s) are not in optical contact with the waveguide face(s) or each other. Non-optical contact may be obtained by arranging the optics at distances such as at least about 5 μm, like at least about 10 μm, such as in the range of 5-500 μm, like 10-250 μm.

Optionally, the spacing between the waveguide and the first downstream optical element may be larger, such as in the range of 5-50 mm, such as 10-25 mm, like 10-15 mm.

In a specific embodiment, the ratio of the uplight and the downlight is controllable. This may amongst others be achieved by controlling the amount of light outcoupling from the waveguide into the cavity and/or controlling the amount of light escaping from the cavity. In an embodiment, the ratio is controllable in one or more of the above-mentioned ratios.

In an embodiment, the illumination device further comprises an adjustable cavity opening, which is arranged to control the amount of first face light escaping from the cavity. In a specific embodiment, the cavity comprises a diaphragm having an adjustable diaphragm opening as adjustable cavity opening. In yet another embodiment, the cavity comprises an adjustable reflector, and the adjustable reflector is arranged to control reflection at the adjustable reflector back into the waveguide element. In yet a further embodiment, the structures are elastically deformable, and the illumination device further comprises an actuator, arranged to plastically deform the structures.

Hence, the illumination device may further comprise a controller, which may be a remote controller, arranged to control the ratio of the uplight and the downlight. The controller may alternatively or additionally also be arranged to control one or, where applicable, more of: color, color temperature and intensity of the uplight and the downlight.

This invention describes a way to extract light from a light guide which can be used for both up and down lighting. It further allows the use of a thin, large-area heat sink, because the uplight part may require only a small part of the illumination device area.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily to scale. In the drawings, less relevant features like electrical cables or connections, ballasts, etc. have not been drawn for the sake of clarity.

DETAILED DESCRIPTION

Figure 1A:
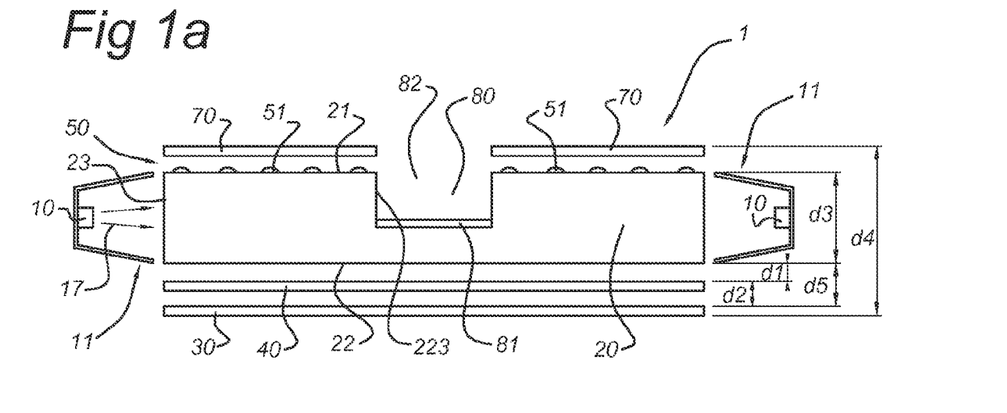
FIGS. 1a-1b schematically depict some embodiments of the illumination device.

FIG. 1a schematically depicts an illumination device 1 according to an embodiment of the invention. The illumination device 1 comprises a waveguide element 20. This waveguide element 20 comprises a first face 21, which is also indicated as top face, and a second face, indicated with reference 22, which is also indicated as bottom face. The edge is indicated with reference 23. The waveguide 20 may be made of any material known in the art, such as transplant plastics, glass, etc. At the edge of the waveguide, a light source 10, especially a LED, is arranged, which is arranged to provide light 17, also indicated as LED light 17, for incoupling into the waveguide 20 via edge 23. Optionally, collimator optics 11 may be present, arranged to collimate, at least part of the LED light 17, into the edge 23 of the waveguide 20. The light that enters the waveguide 20 via edge 23 will travel through the waveguide 20 and may reach top face 21.

Top face 21 comprises structures 51, which are arranged to couple at least part of the light within the waveguide out of the waveguide element 20 and via the second face 22. In this way, second face light 37 (see below) is provided, which is also indicated as downlight. Hence, the structures 51 are arranged to couple light out of the waveguide 20 in a direction away from the first face 21. The structures 51 may form a pattern, which is indicated with reference 50.

Further, the illumination device 1 may comprise a reflector 70, which is arranged to facilitate that light that escapes via first face 21 is reflected back into the waveguide 20. This light can again be outcoupled at other places of the waveguide 20. Essentially the waveguide 20 has two places where light may couple out. One place is the second face, or bottom face 22, and the other place is cavity 80. Thus, the illumination device 1 further comprises cavity 80, which is arranged to allow light to escape from the waveguide element 20 into this cavity 80. This cavity 80 has an opening 82 (cavity opening) through which light may escape from the cavity in a direction away from second face 22. In this way the illumination device 1 is able to provide light in at least two directions. One direction is up, i.e. light escaping from the waveguide via the cavity 80 in a direction away from the second face 22. And in the other direction light travels away from the first face 21 via second face 22. The cavity may further comprise a reflector 81 which is arranged to reflect at least part of the light in the cavity 80 in a direction away from the second face 22. In this way first face light 47 (see below) may be provided, this is indicated also as uplight.

The illumination device 1 may further comprise an optional diffuser 40, which is arranged to promote the mixing of the light escaped from the second face 22.

Further, the illumination device 1 may comprise glare-suppression optics 30 which is arranged to focus the light escaping from second face 22 in predetermined directions, such that glare may be minimized. The optional diffuser 40 may be arranged at a distance d1 from second face 22, which distance may be zero or larger (see also below). Further, the glare-suppression optics 30 may be arranged at a distance d5 from second face 22. The total thickness of the illumination device 1 including the optional diffuser 40 and the optional glare-suppression optics 30 is indicated by means of d4. The thickness of the waveguide 20 is indicated by means of d3. FIG. 1a schematically depicts an embodiment where the cavity 80 is a cavity within waveguide 20. This cavity 80 is a cavity extending from the first face 21 into part of the waveguide 20. In this embodiment cavity 80 is not a hole in the waveguide 20.

Preferably, there is no optical contact between the optics. Hence, if applicable, the distance between the face and optional downstream optics, as well between further downstream optics, respectively, is preferably at least about 5 µm, like at least about 10 µm, such as in the range of 5-500 µm, like 10-250 µm. Therefore, in the embodiment schematically depicted in for example FIG. 1a and other Figures, distances d1 and d6 may be in the range of 5-500 µm.

Figure 1B:
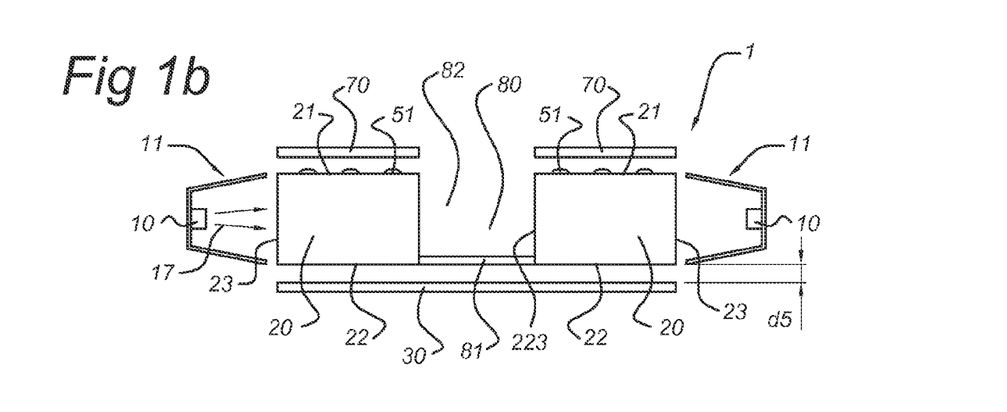

FIG. 1b schematically depicts an embodiment where the cavity 80 may be a hole in the waveguide 20. Or, alternatively, two waveguides 20 may be provided, such that a cavity 80 is present between them. In this embodiment, by way of example, only the glare-suppression optics 30 is drawn, and diffuser 40 is not present.

Both FIGS. 1a and 1b, can be seen as side views of embodiments of the illumination device 1 according to the invention.

Therefore, in the embodiment schematically depicted in for example FIG. 1b, distance d5 may be in the range of 5-500 µm.

Figure 2A:
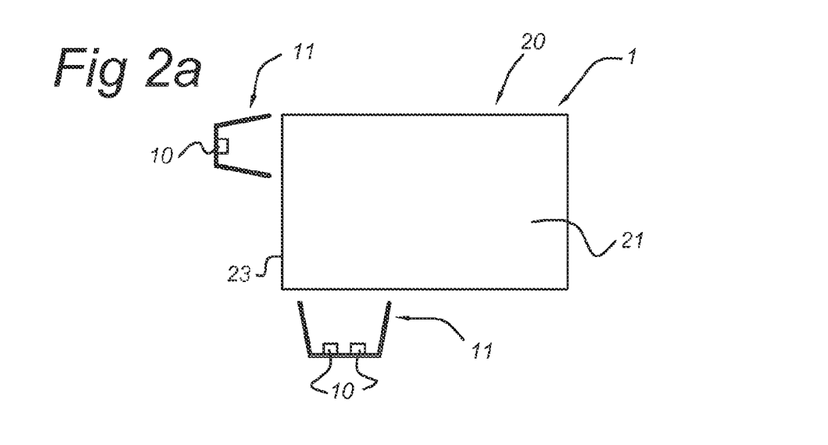
FIGS. 2a-2d schematically depict some shapes of the waveguide and arrangements of the LED light sources.

FIG. 2a schematically depicts an embodiment of the illumination device 1, seen in top view. By way of example only a few light sources 10 are depicted. At one part of the edge 23 two LEDs 10 in one collimator 11 are depicted and at another part of the edge 23 one LED 10 in one collimator 11 is depicted. Dependent upon the way the structures 51 (not shown in this Figure) are provided, the LED sources 10 may be provided at any desired position. There may be no necessity to arrange the LED light sources 10 evenly or symmetrically.

Figure 2B:
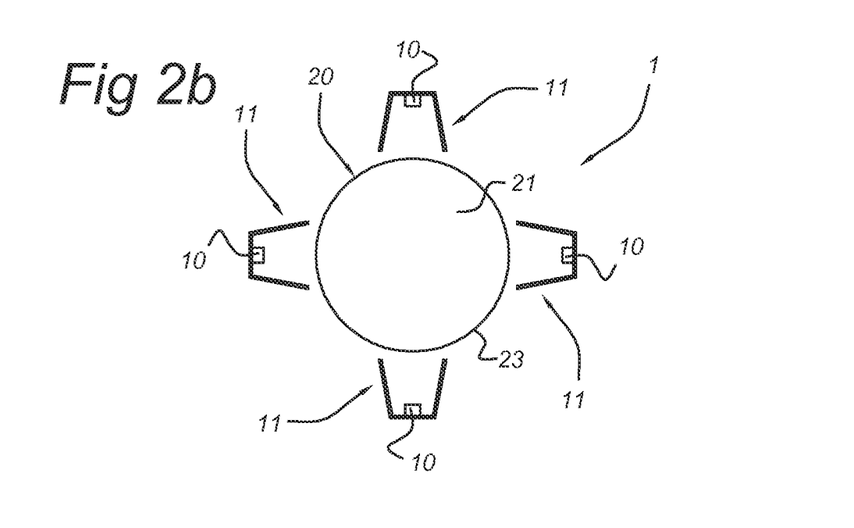
Figure 2C:
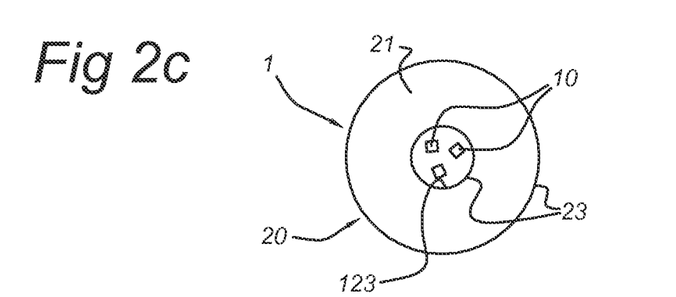
Figure 2D:
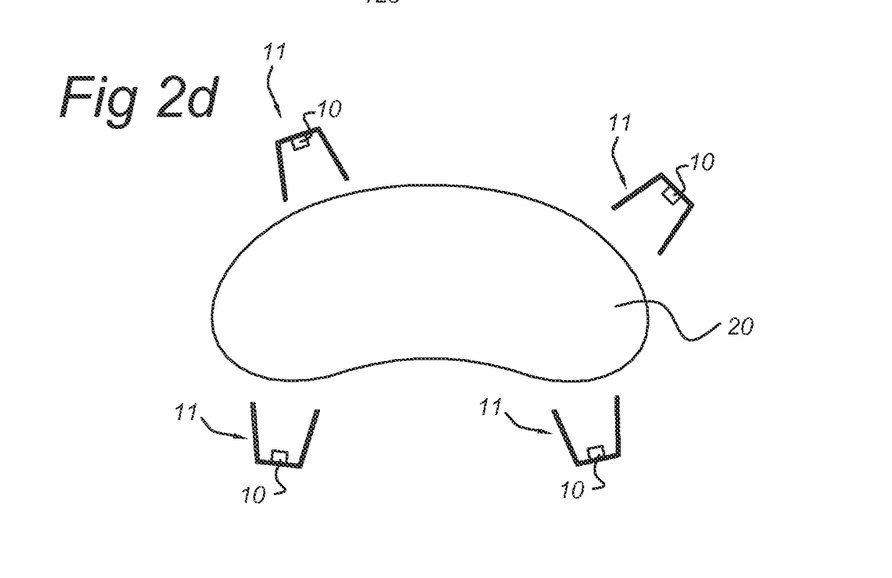

FIGS. 2b, 2c, and 2d schematically depict a number of possible embodiments. In FIG. 2b, a round waveguide 20 is depicted as a plurality of LED light sources 10 arranged around the edge 23. In FIG. 2c, schematically an embodiment of the illumination device 1 is depicted, wherein the waveguide 20 is also round, but the LED light sources 10 are arranged in a central cavity. FIG. 2d schematically depicts the freedom of shape that the illumination device 1 may have.

Figure 3A:
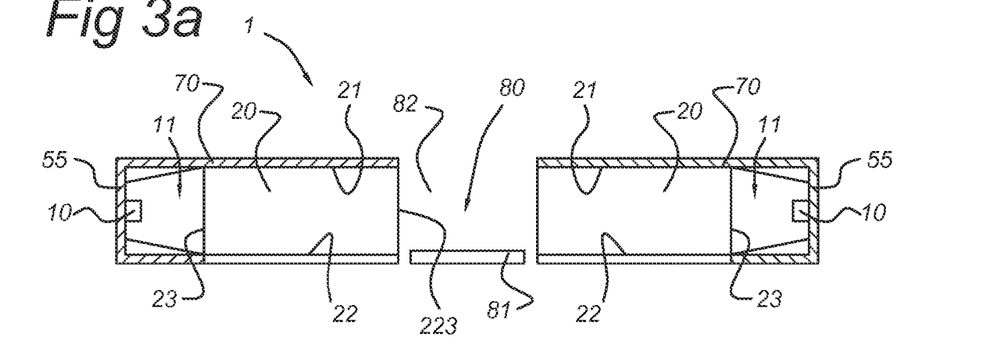
FIGS. 3a-3c schematically depict some specific embodiments of the illumination device.
Figure 3B:
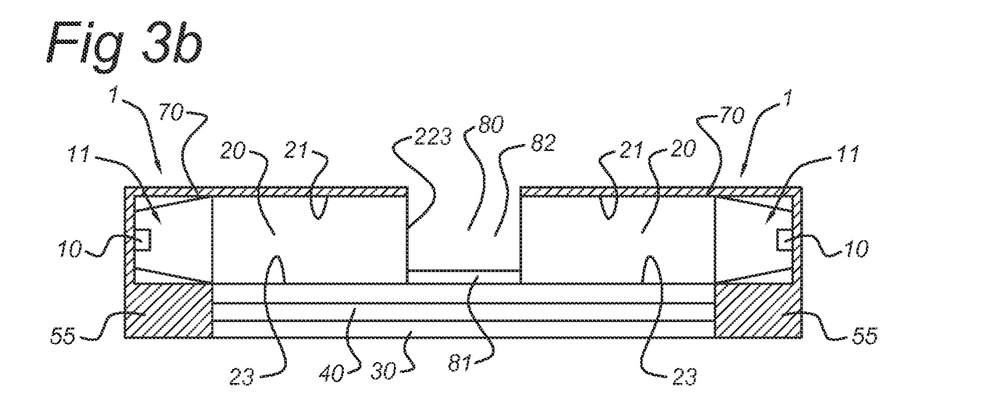
Figure 3C:
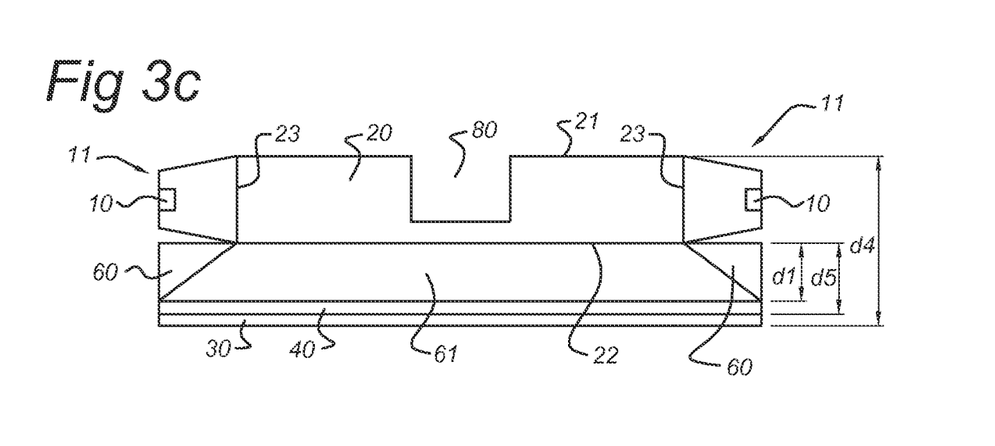

FIGS. 3a, 3b, and 3c schematically depict further embodiments of the illumination device 1 according to the invention. FIG. 3a schematically depicts an embodiment of the illumination device 1, further comprising a heat sink 55. This heat sink may be in physical contact with the LED light source 10 and/or the optional collimator 11. Further, reflector 70 might be used as heat sink 55; in this way, also heat generated within the waveguide 20 may escape via heat sink 55, which may thus be in physical contact with at least part of the first face 21 (comprising the structures 51).

FIG. 3b schematically depicts the same embodiment as FIG. 3a, with the exception that also the optional diffuser 40 and the optional glare-suppression optics 30 are present. The heat sink 55 may also be in physical contact with the optional diffuser 40 and/or the glare-suppression optics 30. Hence, also heat generated in the diffuser 40 and/or the glare-suppression optics 30 may dissipate via heat sink 55.

FIG. 3c schematically depicts an embodiment in which a spacing 61 is present. Such a spacing 61 may be provided by arranging the diffuser 40 and the glare-suppression optics 30 at a distance from second face 22. As mentioned above, the distance between second face 22 and the diffuser 40 is indicated with d1. Further reflectors 60 may be provided to provide a closed spacing 61. Thus, the spacing 61 may be an enclosure, enclosed by second face 22, reflectors 60 and one or more of the diffuser 40 and glare-suppression optics 30. Even when such a spacing 61 is applied, the thickness of the illumination device 1 may be small. For instance the thickness d4 may be in the range of 5-50 mm.

Figure 4A:
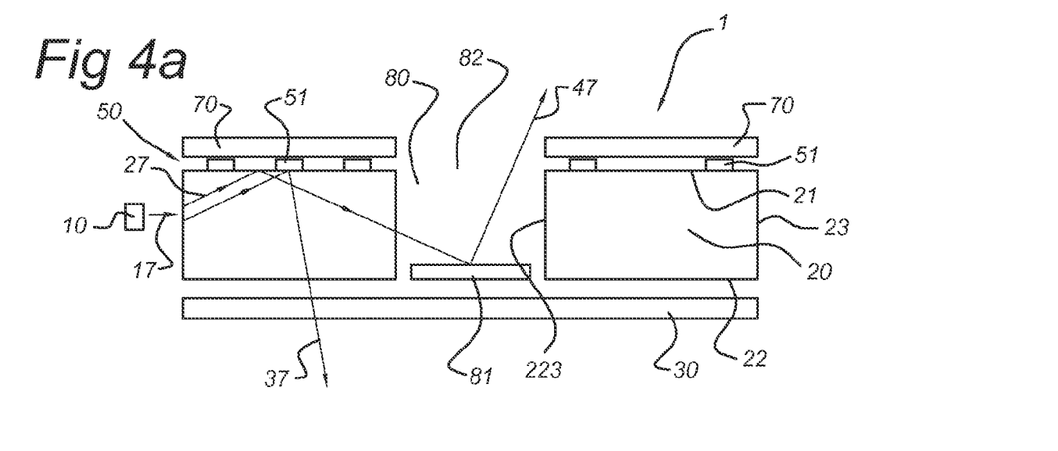
FIGS. 4a-4b schematically depict some principles of the cavity.
Figure 4B:
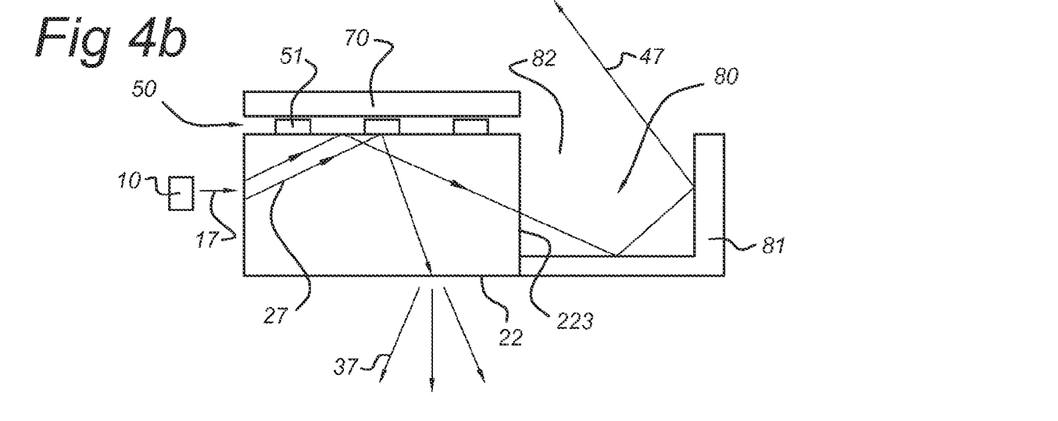

FIGS. 4a and 4b schematically depict how the illumination device 1 may function. The LED light source 10 provides light 70 which is coupled into the waveguide 20 via edge 23. The light within the waveguide 20 is indicated by means of reference 27. This light may be reflected at the edges and faces of the waveguide 20. At some place light 27 may be reflected at structure 51 in a direction away from the first face 21 to the second face 22. This light may escape from the waveguide. Light escaped from the waveguide 20 via second face 22 is indicated by means of reference 37, which is herein also called second face light or downlight 37. A part of the light 27 within the waveguide may also escape via another edge, indicated by means of reference 223, which is the edge of the cavity 80 comprised by the illumination device 1. This light may be reflected by reflector 81, comprised by the cavity 80, and may in this way escape from the illumination device 1 in a direction away from second face 22. This light is indicated by means of reference 47 and is herein also indicated as first face light or uplight 47. This light escapes from the cavity via opening 82.

FIG. 4b schematically depicts an embodiment in which the cavity 80 may be at an edge of the waveguide 20. Again, light 27 within the waveguide may escape from the waveguide 20 via cavity edge 223 into cavity 80. This light, escaped from the waveguide 20, may be reflected within the cavity 80 by reflector 81 in a direction away from the second face 22 and leave the illumination device as uplight 47 (via cavity opening 82).

Figure 5:
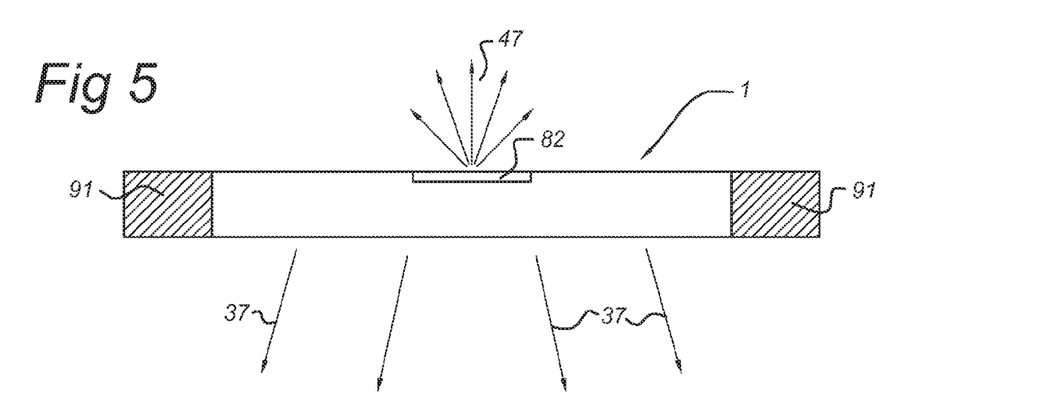
FIG. 5 schematically shows an example of the illumination device.

FIG. 5 schematically depicts how the illumination device 1 may function. It shows optics compartment 91, in which the LED light source 10, and the optional optics 11 and heat sink 55 may be comprised, and this Figure shows how light may escape from the illumination device 1. Light may escape from second face 22 as downlight 37 and light may escape from first face 21, actually from the cavity opening 82, as uplight 47.

FIGS. 6a-6k schematically depict a plurality of possible embodiments of the illumination device 1 according to the invention.

Figure 6A:
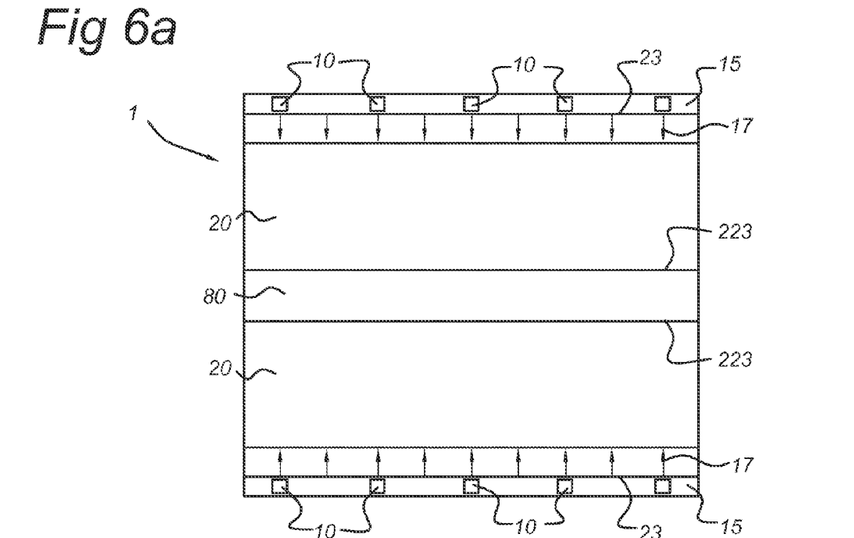
FIGS. 6a-6k schematically depict some configurations of waveguides and arrangements of cavities and LED light sources.

FIG. 6a schematically depicts an embodiment in which two waveguides 20 are provided in such a way that there is a cavity 80 between the waveguides 20. This cavity may be used to couple light out of the illumination device 1. Further, this embodiment schematically shows that a plurality of LED light sources 10 is applied. For instance bars, indicated by means of reference 15, which comprise a plurality of LED light sources 10, may be arranged at the edges of the waveguides 20, respectively. FIG. 6a is depicted in top view.

Figure 6B:
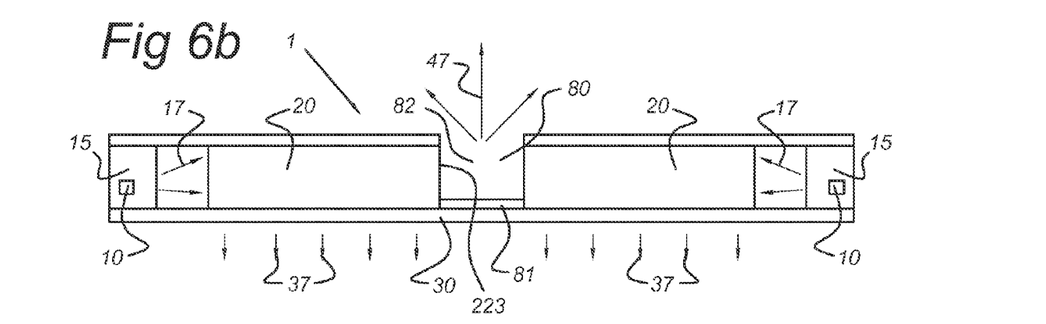

FIG. 6b is a side view of the same embodiment as schematically depicted in FIG. 6a.

Figure 6C:
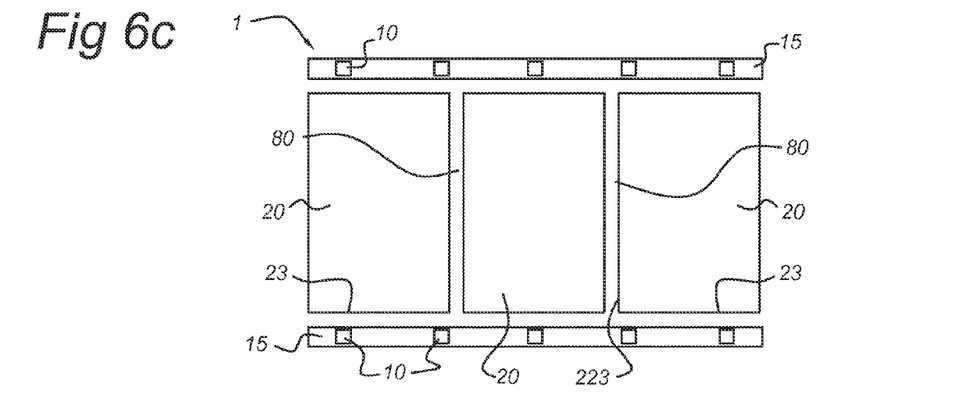

FIG. 6c schematically depicts a variant on the embodiment schematically depicted in FIGS. 6a and 6b. FIG. 6c is a top view of this embodiment. This embodiment comprises a plurality (here three) of waveguides 20, wherein in between the waveguides 20 cavities 80 are present. Again a plurality of LED light sources 10 is used to couple light from these LED light sources into the waveguides 20 via the edges 223 of these waveguides.

Figure 6D:
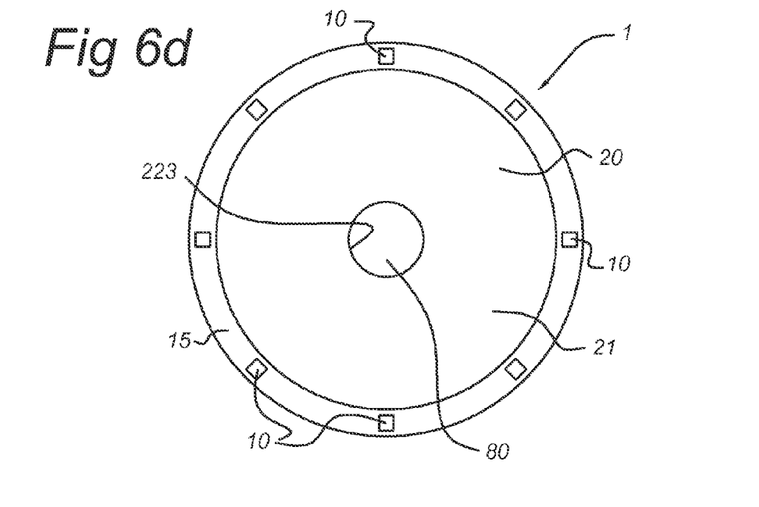

FIG. 6d schematically depicts an embodiment in which the waveguide 20 is circular and the LED light sources 10 are arranged at the outer edge of the circular waveguide 20. The waveguide further comprises a central cavity 80 from which at least part of the incoupled light may escape.

Figure 6E:
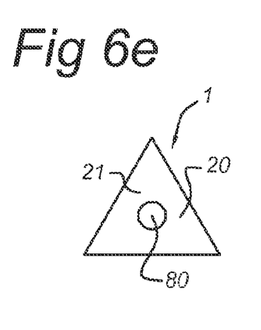
Figure 6F:
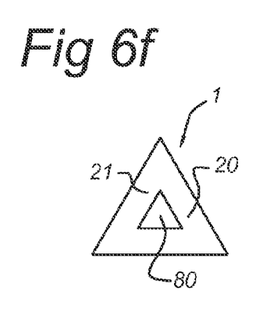
Figure 6G:
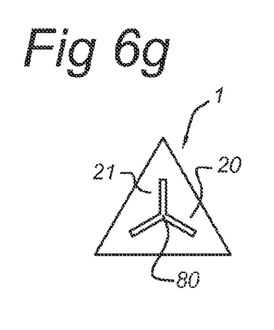

FIGS. 6e, 6f and 6g schematically depict shapes of the waveguide 20 that may be used in embodiments of the illumination device 1 according to the invention. FIG. 6e schematically depicts a triangular waveguide with a circular cavity 80; FIG. 6f schematically depicts a triangular waveguide 20 with a triangular cavity 80; and FIG. 6g schematically depicts a triangular waveguide 20 with a multichannel light cavity 80.

Figure 6H:
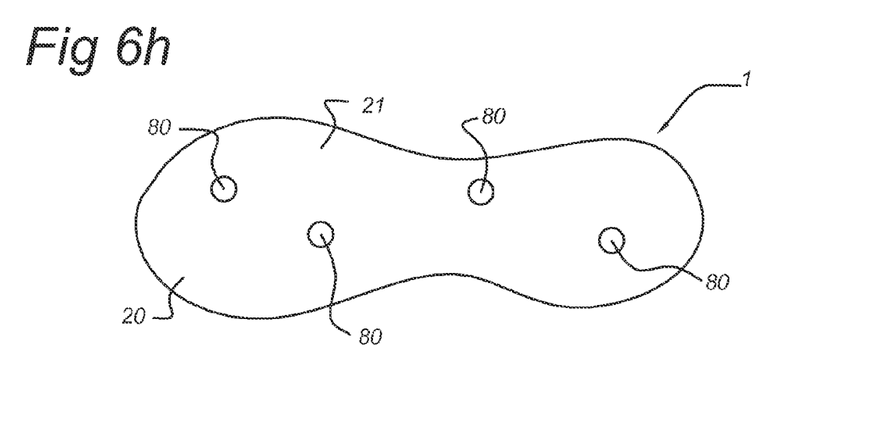

FIG. 6h schematically depicts a free form illumination device 20, comprising cavities 80 distributed over the waveguide 20.

Figure 6I:
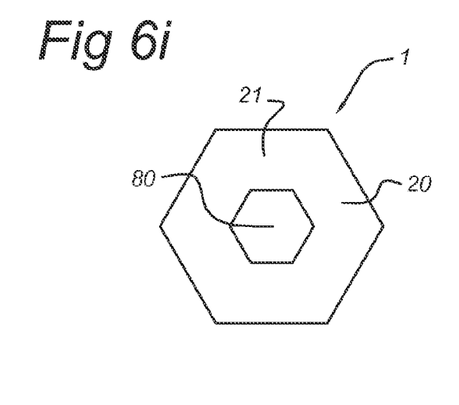
Figure 6J:
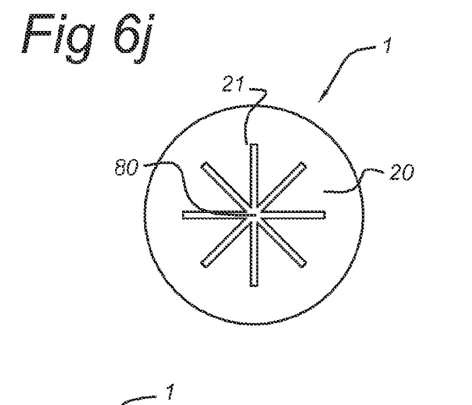

FIGS. 6i and 6j again show some shapes of the waveguide 20 that may be used in the illumination device 1 according to the invention. FIG. 6i schematically depicts a hexagonal waveguide 20 with a hexagonal cavity 80; and FIG. 6*j* schematically depicts a circular waveguide 20 with a multichannel light cavity 80.

Figure 6K:
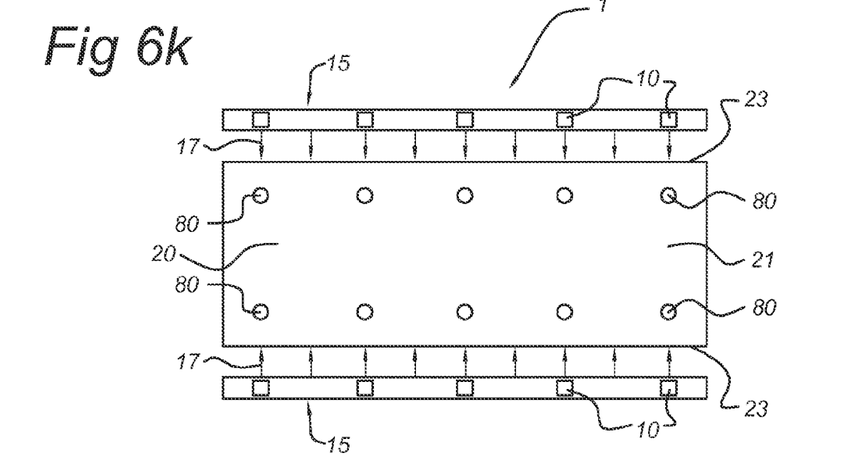

FIG. 6*k* schematically depicts an embodiment in which the waveguide 20 comprises a plurality of cavities 80, wherein by way of example the cavities 80 are depicted as circular holes. For instance these cavities 80 may be partial cavities or may extend from first face 21 to second face 22. The waveguide 20 is illuminated by a plurality of LED light sources 10, arranged in LED bars 15, which illuminate the edges 23 of the waveguide 20.

FIGS. 7*a*-7*d* schematically depict embodiments in which the ratio of uplight 47 to downlight 37 can be varied.

Figure 7A:
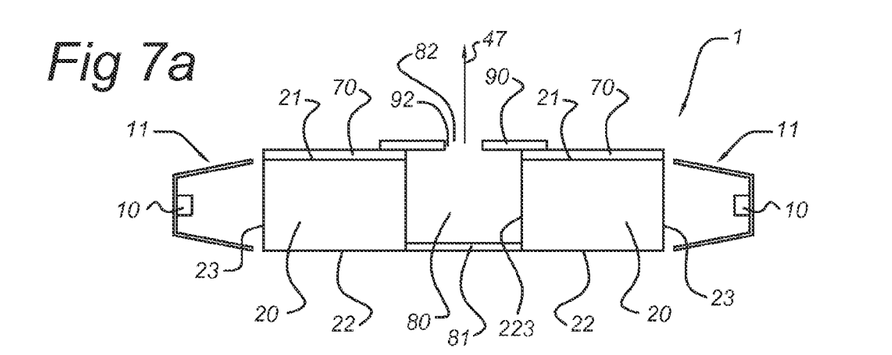
FIG. 7a-7d schematically depict some embodiments wherein the ratio of uplight and downlight is variable.

FIG. 7*a* schematically depicts an embodiment in which the cavity opening 82 is variable. When having a variable cavity opening 82, i.e. the width of the opening is variable, the amount of light 47 escaping from the illumination device can be tuned. In FIG. 7*a*, by way of example a diaphragm 90 is depicted with an adjustable diaphragm opening 92. Preferably, the part of the diaphragm 90 directed towards the cavity is reflective. By opening or closing the diaphragm opening 92 the amount of light 47 escaping can be controlled. When the opening 82 (92) is smaller, light will be reflected back into the cavity and may partly enter the waveguide 20 again. When the opening 82 (92) is large, substantially no light may be reflected at the diaphragm 90, and thus light 47 may escape unhindered from the cavity 82.

Figure 7B:
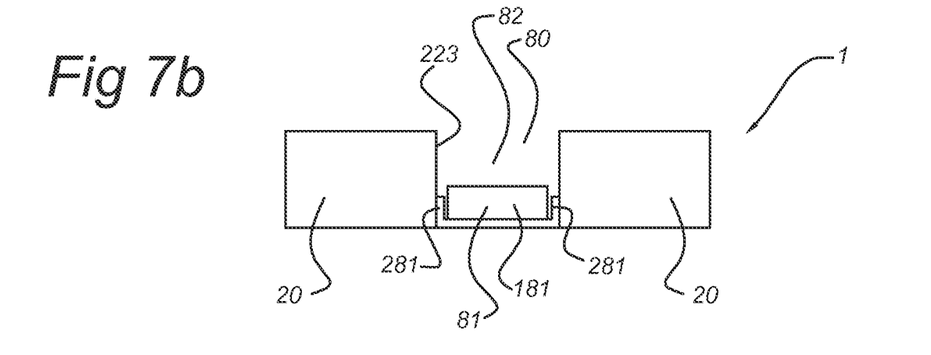
Figure 7C:
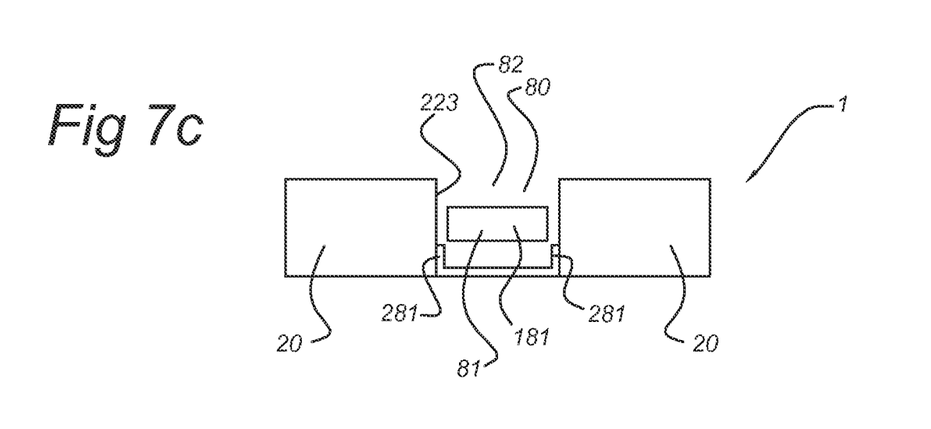

FIGS. 7*b* and 7*c* schematically depict an embodiment in which the cavity 80 comprises an adjustable reflector 181. This adjustable reflector 181 can be adjusted for instance in height. FIG. 7*b* schematically depicts the adjustable reflector 181 in a first position, in which light escaping from the edge 223 is not substantially reflected back into the waveguide 20 by this reflector 181. FIG. 7*c* schematically depicts the state wherein the adjustable reflector 181 is arranged to reflect at least part of the light escaping from the waveguide 20 at edge 223 back into the waveguide 20. In the first state, as depicted in FIG. 7*b*, the adjustable reflector may be in a kind of reflector cavity, which may be composed of the reflector 181 and reflectors 281.

Figure 7D:
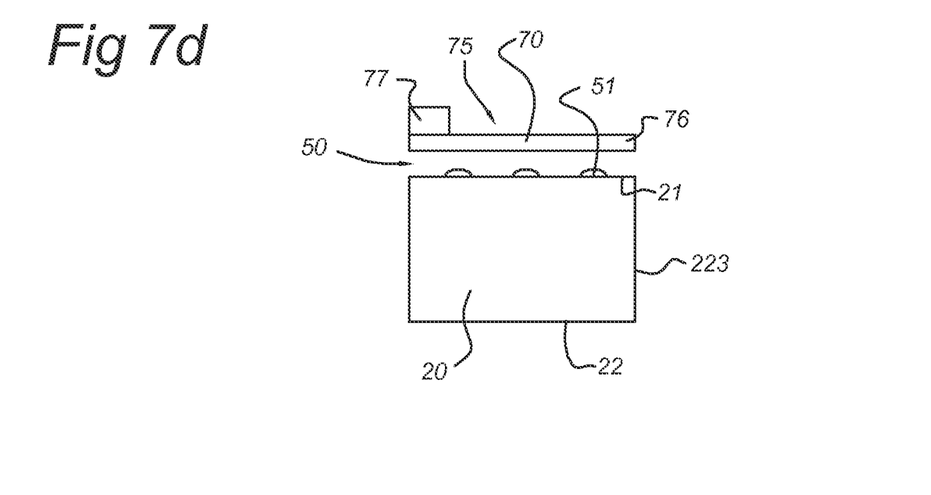

FIG. 7*d* schematically depicts an embodiment in which the structures 51 are elastically deformable. When a pressure is applied on the structures 51, this may influence the amount of light escaping via second face 22. Therefore, in this embodiment the illumination device 1 further comprises an actuator 75, which may be arranged to apply pressure on at least part of the total number of structures 51. By way of example, FIG. 7*d* shows an embodiment of the actuator 75 comprising pressure means 76, which may for instance be the reflector 70. Further, the actuator 75 may comprise a motor or other device, indicated by means of reference 77, arranged to apply a force on the pressure means 76, such that the structures 51 are pressed upon. In this way the amount of light escaping via the second face 22, and thus the ratio of the amount of uplight 47 and downlight 37 may be controlled.

Further Specific Embodiments

The basic embodiment may consist of a transparent polymer (e.g. PMMA) rectangular light guide plate provided with a screen printed (or ink jet printed) pattern of outcoupling dots or stripes ("white paint") on the upper side. Light from a LED array is (preferably) collimated and injected into the light guide. The dot pattern density is optimized in such a way that light is coupled out uniformly over the whole area of the waveguide. The emitted light may be collimated by a prismatic plate or foil (such as an MLO (micro lighting optics plate/prismatic plate (WO2006097859). This plate ensures effective glare control. The dot patterns may be optimized using the Backlight Pattern Optimiser (BPO) in LightTools 6.1. (supplier: Optical Research Associates).

The LED array may in an embodiment consist of both "cool white" and "warm white" LEDs. The two LED types are placed in an alternate sequence CW (cool white)-WW (warm white)-CW-WW-CW-etc. A uniform color light output is determined by the pitch (p) of one LED type and the distance between the emitting surface of the LEDs and the light guide entrance (L). Good uniformity is reached when p/L>1. The LEDs can be placed on both (long) edges of the light guide (for thermal reasons) although many other configurations are possible. Other LED combinations are also possible (R-G-B, R-G-B-A, CW-A, . . . )(A=amber). Alternatively, CW-WW-red can be applied. Characteristic CW:WW LED number ratios may be in the range of 0.5<CW/WW<2, such as CW:WW=1:1 (i.e. n CW LEDs:n WW LEDs).

The way light is injected into the light guide determines (part of) the total optical efficiency of the system. In general, a collimated LED beam injected into the light guide improves optical efficiency as compared with Lambertian LEDs placed close to the light guide (without any collimation). On the other hand, when this beam is too collimated, efficiency may drop again. In a typical example, an array of Rebel LEDs is collimated by placing the LEDs in a Compound Parabolic Concentrator (CPC)-type of linear reflector. The CPC is lengthened by a straight part to fulfill the requirements of uniform incoupling (see p/L ratio above). The typical exit angle (in air) is 37° and gives an optimum total optical efficiency. Other configurations and other ways to collimate are possible, depending on mechanical restrictions or aesthetical requirements.

A relevant element in the invention is that a well-defined portion of the light flux is directed in downward direction (e.g. 80%) and the rest is directed in upward (ceiling) direction (e.g. 20%). The light in the upward direction does not need not to be collimated and may have essentially a Lambertian character. Alternatively, a bat-wing intensity may also be provided. Downstream of the first face comprising the structures, and especially downstream of the cavity, further optics may be provided to tune the uplight beam shape. The up/down ratio may amongst others be determined by the reflectivity of the collimator plate (and optional foils) and the density of the outcoupling dots or stripes on the light guiding plate.

The shape of the modules is not restricted to simple square modules. In principle all arbitrary (2D) shapes are possible. Full freedom (3D) can be achieved when the light guides are thin enough to bend (e.g. <2 mm).

In another embodiment a substantial air gap is introduced between the light guide and the MLO plate (FIG. 3*c*). This allows us to design illumination devices without edge or bezel. Part of the LED collimator unit is now hidden in the cavity between the light guide and the collimator. The width of the bezel is determined by the amount of collimation and mixing length required. Optical structuring of the entrance of the light guide helps to further reduce the mixing length and to make a more aesthetic illumination device. The thickness of the illumination device may for instance be in the 15-25 mm range. This design is also much more tolerant for color variations close to the incoupling sides.

When looking inside the illumination device, one may be able to see the combined effect of the MLO structure and the pattern printed on the light guide. The effects can be subtle and highly decorative, but also undesired Moire effects may occur, which is often considered unwanted. To remove these effects completely, a holographic diffuser can be placed between the light guide and the collimator. In this manner a very smooth luminance surface may be created. When e.g. an elliptical diffuser is used, light is scattered preferably in the direction of the LED array. These strategies also help to smoothen color variations.

The use of holographic foils also helps when a low LED density is required. In this case, large outcoupling dot gradients may be needed, which can be "made invisible" by using the proper holographic diffuser.

Calculations show that there is a trade-off between up/down flux ratio and the optical efficiency of the illumination device. These strategies are useful when you construct a wall-mounted illumination device where you need collimated light in both up and down directions.

The construction is not limited to a single light guide. When using two light guides it becomes possible to make a system having a dynamic up/down ratio. Also the color of the upward and downward beam can be different. Various other combinations are possible. For instance, in an embodiment a stack of waveguides is applied, wherein preferably the stack is provided with one or more accompanying LED light sources, and wherein the stack preferably comprises the first and second face.

Above, a visual impression of the illumination device is described. Up to now a constant luminance exit surface was designed by the creation of a well-defined light extraction pattern. An additional feature which can be added is the incorporation of more complex luminance patterns. The luminance of the exit surface may vary in a periodic or random way. One could make all kinds of geometric patterns or create a unique pattern related to the preference of the customers. Also optical illusions (depth, movement) can be incorporated in the design.

It is possible to tune the up/down ratio by tuning the width of the cavity or channel between the two light guides. The channel is in general closed on one side with a reflector (diffuse/specular). The density of the outcoupling structures can be optimized to ensure a uniform outcoupling of light over the whole area of the light guide. The balance between up and down flux can be further adjusted e.g. by the maximum density of the outcoupling structures and the thickness of the light guide.

The illumination device may for instance consist of two discrete light emitting areas. When some gap between the light guides and the front optics is allowed, a module can be constructed with a continuous front (MLO) surface. The visibility of the reflector between both light guides can be completely masked by a holographic diffuser. The reflector between the two light guide parts can be made partly transmissive to decrease the total thickness of the illumination device.

Light travelling in the upward direction may have a roughly Lambertian intensity distribution but can be collimated or shaped if needed. In all examples the uplighting structures are simply channels or holes covered with a reflector. Other constructions can also be envisaged (e.g. where the channel depth is only part of the total light guide thickness). The uplighting function can be designed in many ways.

In an embodiment, the cavity opening in the top side can be varied by opening and closing a diaphragm with a reflector, such as a reflective foil, on the bottom side. Light that is reflected by this diaphragm may be partly coupled back into the light guide and thus can again be sent downward, changing the up:down ratio dynamically.

By sending a larger fraction of the light back into the light guide the outcoupling of light in a downward direction could become spatially inhomogeneous. Thus, when the aperture is closed completely, more light is reflected back from the centre, resulting in an increase of the light coupled downward in the centre of the illumination device. This effect can be reduced by designing the outcoupling structure in such a way that most light requires travelling back and forth a number of times through the light guide before it is coupled out. This may however result in a lower total efficiency of the illumination device.

A variation of this embodiment would be a system where the user can interchange various reflective plates with holes of different sizes, to vary the ratio in a non-continuous manner.

In an embodiment, to tune the up-down ratio, the reflector between the light guides can be moved up and down to vary the amount of light coupled out at the cavity surface and thus the amount of light coupled out towards the uplighting function. This embodiment has most probably a higher efficiency, since more of the light is directly reflected back into the light guide when the reflector is in the up direction.

In an embodiment, in which the efficiency of the outcoupling structure can be varied, the outcoupling structure is made from a flexible, rubber-like material, preferably white in color. The outcouple efficiency will depend on the fraction of the structure in contact with the light guide. By increasing the pressure, thus pushing the rubber more firmly onto the light guide, the area in contact with the light guide and thus contributing to the outcoupling can increase. This will result in a larger fraction of the light leaving the light guide from the front surface and thus being directed downward instead of upward. An advantage of this embodiment could be that (nearly) all the light can be directed in the upward direction and none downward. This embodiment requires a flexible material that can be brought into optical contact in a well-controlled and repeatable manner to ensure an optimal operation of the illumination device.

The invention may be highly relevant for office lighting, although also other application areas may be envisaged: lighting modules for retail applications, consumer lighting systems.

The terms "corresponding" and "respective" are used to indicate a predominantly one-to-one relationship between a first item and a second item. For example, "each imaging lens of the plurality of imaging lenses is arranged to image a corresponding segment pattern of the plurality of segment patterns into a respective projection image of a plurality of projection images" has to be understood in the sense that one of the imaging lenses is arranged to image predominantly one specific segment pattern into one specific projection image, whereas another one of the imaging lenses is arranged to image predominantly one other specific segment pattern into one other specific projection image.

Throughout this document, the terms "blue light" or "blue emission" especially relate to light having a wavelength in the range of about 410-490 nm. The term "green light" especially relates to light having a wavelength in the range of about 500-570 nm. The term "red light" especially relates to light having a wavelength in the range of about 590-680 nm. The term "yellow light" especially relates to light having a wavelength in the range of about 560-590 nm. The term "light" herein especially relates to visible light, i.e. light having a wavelength selected from the range of about 380-780 nm.

The term white light as used herein, is known to the person skilled in the art. It especially relates to light having a correlated color temperature between about 2,000 and 20,000 K, especially 2700-20,000 K, and for general lighting especially in the range of about 2700 K and 6500 K, and for backlighting purposes especially in the range of about 7,000 K and 20,000 K, and especially within about 15 SDCM (standard deviation of color matching) from the BBL (black body locus), especially within about 10 SDCM from the BBL, even more especially within about 5 SDCM from the BBL. The term "predetermined color" may relate to any color within the color triangle, but may especially refer to white light.

Unless indicated otherwise, and where applicable and technically feasible, the phrase "selected from the group consisting of a number of elements" may also refer to a combination of two or more of the enumerated elements.

Terms like "below", "above", "top", and "bottom" relate to positions or arrangements of items which would be obtained when the multi-beam illumination system is arranged substantially flat on a substantially horizontal surface, with the lighting system bottom face substantially parallel to the substantially horizontal surface and facing away from a ceiling into a room. However, this does not exclude the use of the multi-beam illumination system in other arrangements, such as against a wall, or in other, e.g. vertical arrangements.

The term "substantially" herein, such as in "substantially flat" or in "substantially consists", etc., will be understood by the person skilled in the art. In embodiments the adjective substantially may be removed. Where applicable, the term "substantially" may also include embodiments with "entirely", "completely", "all", etc. Where applicable, the term "substantially" may also relate to 90% or higher, such as 95% or higher, especially 99% or higher, including 100%. The term "comprise" includes also embodiments where the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in sequences other than those described or illustrated herein.

The devices referred to herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The term "and/or" includes any and all combinations of one or more of the associated listed items. The article "a" or "an" preceding an element does not exclude the presence of a plurality of such elements. The article "the" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination device comprising:
a waveguide element comprising a first face, a second face, and a waveguide edge;
a LED light source, arranged to generate light source light, wherein the LED light source is arranged to couple at least part of the light source light into the waveguide element via the waveguide edge of the waveguide element; and
wherein the first face comprises a plurality of structures arranged to couple at least part of the light source light out of the waveguide element via the second face to provide second face light;
a cavity, arranged to allow light source light to escape from the waveguide element into the cavity, and
a reflector in the cavity, arranged to reflect at least part of the light source light in the cavity in a direction away from the second face to provide first face light that escapes from the illumination device, only via the cavity, in the direction away from the second face to illuminate structure beyond the illumination device.

2. The illumination device according to claim 1, further comprising an adjustable cavity opening, wherein the adjustable cavity opening is arranged to control the amount of first face light escaping from the cavity.

3. The illumination device according to claim 2, wherein the cavity comprises a diaphragm having an adjustable diaphragm opening as the adjustable cavity opening.

4. The illumination device according to claim 1, wherein the cavity comprises an adjustable reflector, wherein the adjustable reflector is arranged to control reflection at the adjustable reflector back into the waveguide element.

5. The illumination device according to any one of the preceding claims, wherein the structures are elastically deformable, and wherein the illumination device further comprises an actuator, arranged to plastically deform the structures.

6. The illumination device according to claim 1, wherein the cavity is a recess in the first face.

7. The illumination device according to claim 1, wherein the cavity is a cavity extending from the first face to the second face.

8. The illumination device according to claim 1, comprising a plurality of cavities.

9. The illumination device according to claim 1, comprising a plurality of waveguides, and comprising one or more cavities, wherein the one or more cavities are cavities between adjacent waveguides, respectively.

10. The illumination device according to claim 1, wherein the first face comprises a pattern of reflective dots or stripes.

11. The illumination device according to claim 1, further comprising a diffuser, arranged downstream of the second face.

12. The illumination device according to claim 11, further comprising glare-suppression optics, arranged downstream of the second face and arranged downstream of the diffuser.

13. The illumination device according to claim 12, further comprising a spacing downstream of the second face and upstream of one or more of the diffuser and the glare-suppression optics.

14. The illumination device according to claim 1, further comprising a reflector, arranged to reflect light escaping from the first face back into the waveguide.

15. The illumination device according to claim 1, wherein the first face is in contact with a heat sink.

16. An illumination device comprising:
- a waveguide element comprising a first face, a second face, and a waveguide edge on an outer periphery of the waveguide element;
- a LED light source arranged to generate light source light and couple at least part of the light source light into the waveguide element via the waveguide edge of the waveguide element;
  - wherein the first face of the waveguide element comprises a plurality of structures arranged to couple a first portion of the light source light out of the waveguide element via the second face to provide second face light;
- a cavity formed in the waveguide element, arranged to allow a second portion of the light source light to escape from the waveguide element into the cavity; and
- a reflector in the cavity, arranged to reflect at least part of the second portion of the light source light in a direction away from the second face to provide first face light, only via the cavity.

17. An illumination device comprising:
- a waveguide element comprising a first face, a second face, and a waveguide edge;
- a LED light source arranged to generate light source light and couple at least part of the light source light into the waveguide element via the waveguide edge of the waveguide element;
  - wherein the first face of the waveguide element comprises a plurality of structures arranged to couple a first portion of the light source light out of the waveguide element via the second face to provide second face light;
- a cavity comprising at least one cavity edge and an opening, the at least one edge arranged to allow a second portion of the light source light to exit the waveguide element into the cavity through the at least one edge; and
- a reflector in the cavity, arranged to reflect at least part of the second portion of the light source light through the opening in a direction away from the second face, only via the cavity, to illuminate structure beyond the illumination device.

* * * * *